(12) United States Patent
Liu

(10) Patent No.: US 9,463,700 B2
(45) Date of Patent: Oct. 11, 2016

(54) METHOD OF SELECTING A BATTERY PACK CHARGING PROTOCOL

(71) Applicant: Atieva, Inc., Redwood City, CA (US)

(72) Inventor: Albert Liu, Palo Alto, CA (US)

(73) Assignee: ATIEVA, INC., Menlo Park, CA (US)

( * ) Notice: Subject to any disclaimer, the term of this patent is extended or adjusted under 35 U.S.C. 154(b) by 170 days.

(21) Appl. No.: 14/553,305

(22) Filed: Nov. 25, 2014

(65) Prior Publication Data

US 2016/0144730 A1    May 26, 2016

(51) Int. Cl.
*H02J 7/00* (2006.01)
*B60L 11/18* (2006.01)

(52) U.S. Cl.
CPC .................................. *B60L 11/1809* (2013.01)

(58) Field of Classification Search
CPC ....... H01M 10/446; H02J 7/007; H02J 7/008
USPC .......................................................... 320/137
See application file for complete search history.

(56) References Cited

U.S. PATENT DOCUMENTS

| | | | | |
|---|---|---|---|---|
| 2009/0140698 A1* | 6/2009 | Eberhard | ................ | H02J 7/045 320/152 |
| 2009/0167238 A1* | 7/2009 | McBee | ................ | H02J 7/0031 320/101 |
| 2010/0188043 A1 | 7/2010 | Kelty et al. | | |
| 2011/0156641 A1 | 6/2011 | Kishiyama et al. | | |
| 2012/0086395 A1* | 4/2012 | Kim | .................... | B60L 11/1838 320/109 |
| 2013/0257387 A1* | 10/2013 | Yokoyama | .............. | H02J 7/044 320/137 |
| 2014/0184401 A1 | 7/2014 | Richter et al. | | |
| 2014/0217976 A1* | 8/2014 | McGrath | ............. | B60L 11/1837 320/109 |
| 2015/0268304 A1* | 9/2015 | Yonetani | ................... | H02J 3/32 320/134 |

* cited by examiner

*Primary Examiner* — Arun Williams
(74) *Attorney, Agent, or Firm* — Patent Law Office of David G. Beck

(57) ABSTRACT

A method is provided for optimizing the charging protocol used when charging the battery pack of an electric vehicle, where optimization is based, in part, on the user's intended departure time and intended travel distance. Based on the user's travel information the process determines (i) an optimal charge level that maximizes the battery pack's lifetime while assuring that there is sufficient energy for the vehicle to travel the intended distance and (ii) an optimal charging rate that maximizes the battery pack's lifetime while assuring that the battery pack is charged to the optimal charge level prior to the intended time of departure. Safety margins may be added to the user's travel information, thus insuring that the car is charged and ready for use if the user decides to leave earlier than expected, or if the travel takes a larger charge than expected.

52 Claims, 5 Drawing Sheets

METHOD OF SELECTING A BATTERY PACK CHARGING PROTOCOL

FIELD OF THE INVENTION

The present invention relates generally to an electric vehicle and, more particularly, to a system and method that optimizes battery life.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, and cost.

The most common approach to achieving a low emission, high efficiency car is through the use of a hybrid drive train in which an internal combustion engine is combined with one or more electric motors. In general there are three types of hybrid drive trains: parallel hybrid, series-parallel hybrid, and series hybrid. In a parallel hybrid drive train, the power required to propel the vehicle may be provided by the internal combustion engine or the electric motor, either individually or together. In a series-parallel hybrid drive train, propulsive power is provided by both the internal combustion engine and the electric motor using a power splitter such as a planetary gear set. In a series hybrid drive train, propulsive power is only supplied by the electric motor and the internal combustion engine, which is coupled to a generator, is only used to charge the batteries as necessary.

While hybrid vehicles provide improved gas mileage and lower vehicle emissions, due to their inclusion of an internal combustion engine they still suffer from many of the inherent limitations of such a power source. For example, during operation the vehicle still emits harmful pollution, albeit at a reduced level compared to a conventional vehicle. Additionally, due to the inclusion of both an internal combustion engine and an electric motor(s) with its accompanying battery pack, the drive train of a hybrid vehicle is typically much more complex, resulting in increased cost and weight. Accordingly, several vehicle manufacturers are designing vehicles that only utilize an electric motor, or multiple electric motors, thereby eliminating one source of pollution while significantly reducing drive train complexity.

While the electric drive trains used in all-electric vehicles have proven to be highly reliable, the concerns felt by many people relating to the limited driving range of a typical electric vehicle have led to fewer car sales than would otherwise be expected, especially given the performance and reliability of such cars. Range concerns are further exacerbated by the relatively complex relationships between battery lifetime and charge rate (illustrated in FIG. 1) and between battery lifetime and the level of charge maintained during storage (illustrated in FIG. 2), relationships that a typical car owner/buyer may have heard of but will not fully understand. As a result of not fully understanding the effect that charge rate and state-of-charge (SOC) have on battery life, even if a vehicle permits the driver to set charging parameters, a typical car owner finds it difficult to optimize these parameters. Accordingly, what is needed is a system that simplifies the process of optimizing charging parameters, thereby maximizing battery lifetime, while still insuring that the car's battery is charged when needed and to a level sufficient to meet the needs and expectations of the driver. The present invention provides such a system.

SUMMARY OF THE INVENTION

The present invention provides a method of optimizing the charging parameters for a battery pack coupled to the electric drive train of a vehicle, the method comprising the steps of (i) accepting a set of user determined travel information comprised of an intended departure time and an intended travel distance, where the set of user determined travel information is accepted by a vehicle system controller; (ii) determining an optimal charge level for the battery pack, where the optimal charge level maximizes a battery lifetime characteristic while providing sufficient energy for the vehicle to travel the intended travel distance, and where the step of determining the optimal charge level is performed by the system controller; (iii) determining an optimal charging rate for the battery pack, where the optimal charging rate maximizes the battery lifetime characteristic while being sufficient to complete charging of the battery pack to the optimal charge level prior to the intended departure time, and where the step of determining the optimal charging rate is performed by the system controller; and (iv) charging the battery pack of the vehicle to the optimal charge level, where the charging step is performed at the optimal charging rate. In general, the intended departure time identifies the first expected time of usage for the vehicle after completion of the step of battery pack charging while the intended travel distance identifies the total expected travel distance during a period of time occurring between completion of the charging step and the next (i.e., subsequent) charging cycle. The user determined travel information may be input via a user interface coupled to the system controller; alternately, the user determined travel information may be input from a remote device coupled to the system controller via a communication port; alternately, the user determined travel information may be input from a remote device coupled to the system controller via a wireless communication link.

In one aspect, the method may include the steps of adding a first safety margin to the intended departure time to define a modified departure time (e.g., an earlier departure time than the intended departure time) and adding a second safety margin to the intended travel distance to define a modified travel distance (e.g., a travel distance that is greater than the intended travel distance), where the first and second safety margins are added by the system controller, and where the optimal charge level determined by the system controller is sufficient to supply energy to the electric drive train for the vehicle to travel the modified travel distance and the optimal charging rate determined by the system controller is sufficient to complete charging of the battery pack prior to the modified departure time. The second safety margin may be calculated by multiplying the intended travel distance by a preset percentage. A set of user defined safety margins may be accepted by the system controller, where the user defined safety margins are comprised of the first and second safety margins. A set of manufacturer defined safety margins may be accepted by the system controller, where the manufacturer defined safety margins are comprised of the first and second safety margins.

In another aspect, the intended travel distance corresponds to the user itinerary (e.g., a plurality of identified locations). The method may then include the step of calculating a total travel distance based on the user itinerary, where the optimal charge level maximizes the battery lifetime characteristic while providing sufficient energy for the vehicle to travel the total travel distance.

In another aspect, the optimal charge level is based on a set of battery pack characteristics as well as the intended travel distance and the battery lifetime characteristic. The set of battery pack characteristics may include battery pack conversion efficiency data. The method may include the step of inputting the battery pack characteristics into the system controller, where a vehicle manufacturer performs the inputting step. The system controller may modify the set of battery pack characteristics based on the monitored age of the batteries. The method may include the steps of (i) monitoring the battery pack to determine a set of performance characteristics, (ii) recording the set of performance characteristics, and (iii) modifying a baseline set of battery pack characteristics in view of the set of performance characteristics in order to determine the set of battery pack characteristics used by the system controller to determine the optimal charge level. The method may include the step of determining the vehicle user's driving style and then basing the optimal charge level on the user's driving style as well as the set of battery pack characteristics, intended travel distance and battery lifetime characteristic. The method may include the step of determining a set of ambient environmental conditions and then basing the optimal charge level on the ambient environmental conditions as well as the set of battery pack characteristics, intended travel distance and battery lifetime characteristic.

In another aspect, the optimal charge level determined by the system controller is sufficient to supply energy to the vehicle to travel the intended travel distance while maintaining at least a minimum state-of-charge (SOC) until a subsequent charging cycle.

In another aspect, the optimal charging rate determined by the system controller is based on the optimal charge level, the battery lifetime characteristic, the intended departure time and the current time.

In another aspect, the optimal charging rate determined by the system controller is based on a set of battery pack characteristics, the optimal charge level, the battery lifetime characteristic and the intended departure time. The method may include the step of inputting the battery pack characteristics into the system controller, where a vehicle manufacturer performs the inputting step. The system controller may modify the set of battery pack characteristics based on the monitored age of the batteries. The method may include the steps of (i) monitoring the battery pack to determine a set of performance characteristics, (ii) recording the set of performance characteristics, and (iii) modifying a baseline set of battery pack characteristics in view of the set of performance characteristics in order to determine the set of battery pack characteristics used by the system controller to determine the optimal charging rate.

The charging step may be performed automatically; alternately, the method may include the step of issuing a confirmation request prior to performing the charging step, where the system controller automatically performs the charging step when a positive response to the confirmation request is received, and where the system controller does not automatically perform the charging step when a negative response to the confirmation request is received.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to an assembly of one or more batteries electrically interconnected to achieve the desired voltage and capacity, where the battery assembly is typically contained within an enclosure. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
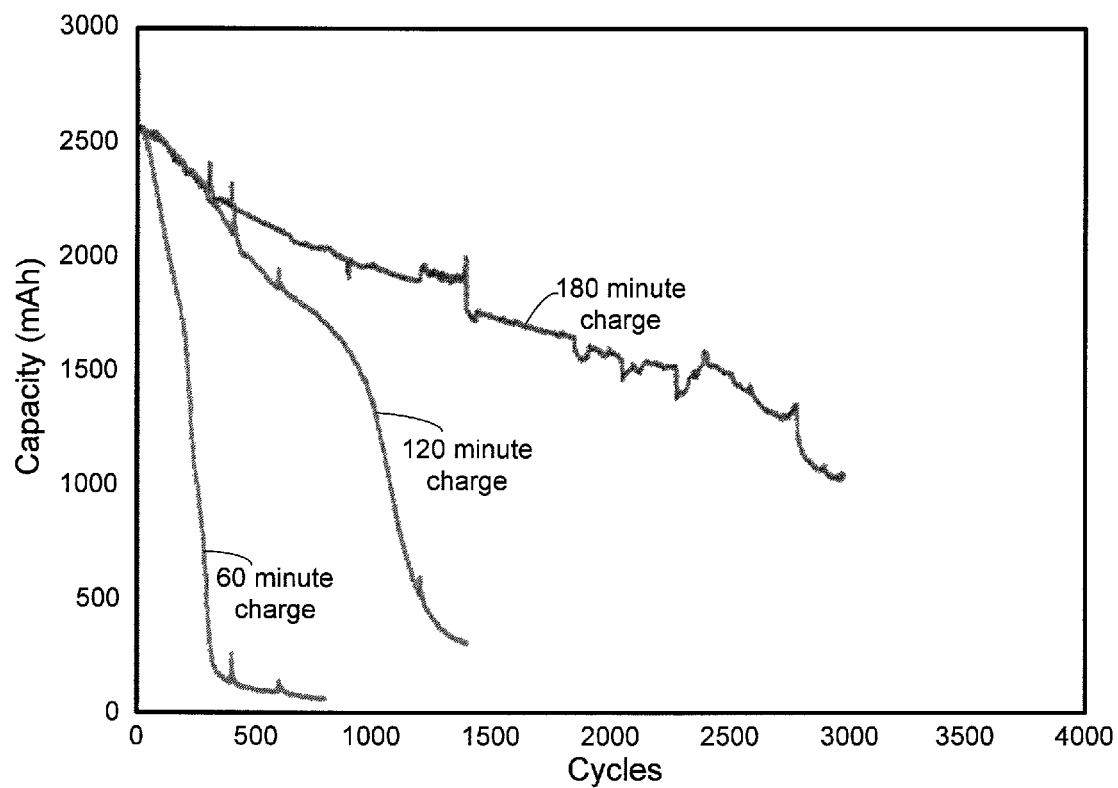
FIG. 1 illustrates the relationship between charge rate and battery lifetime.
Figure 2:
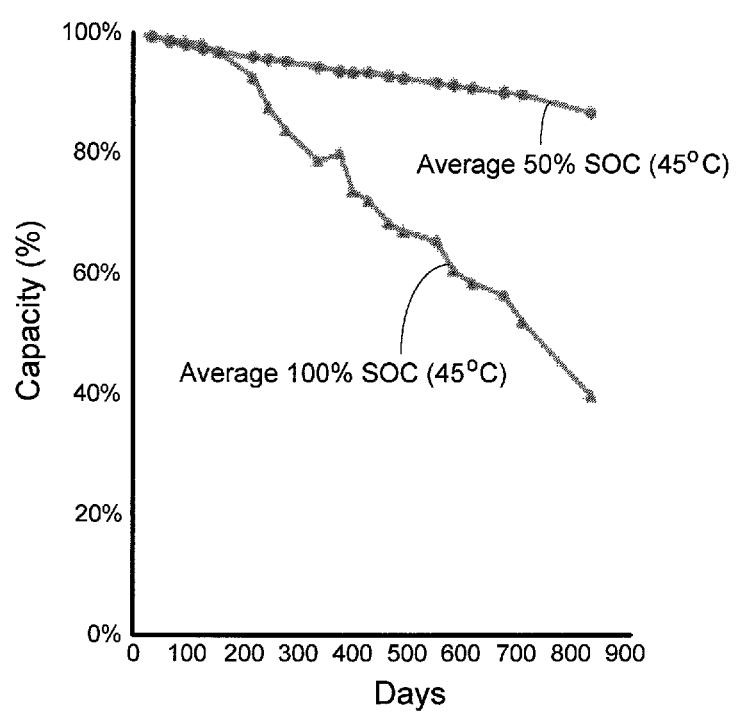
FIG. 2 illustrates the effects of storing a battery at various levels of charge on battery lifetime.
Figure 3:
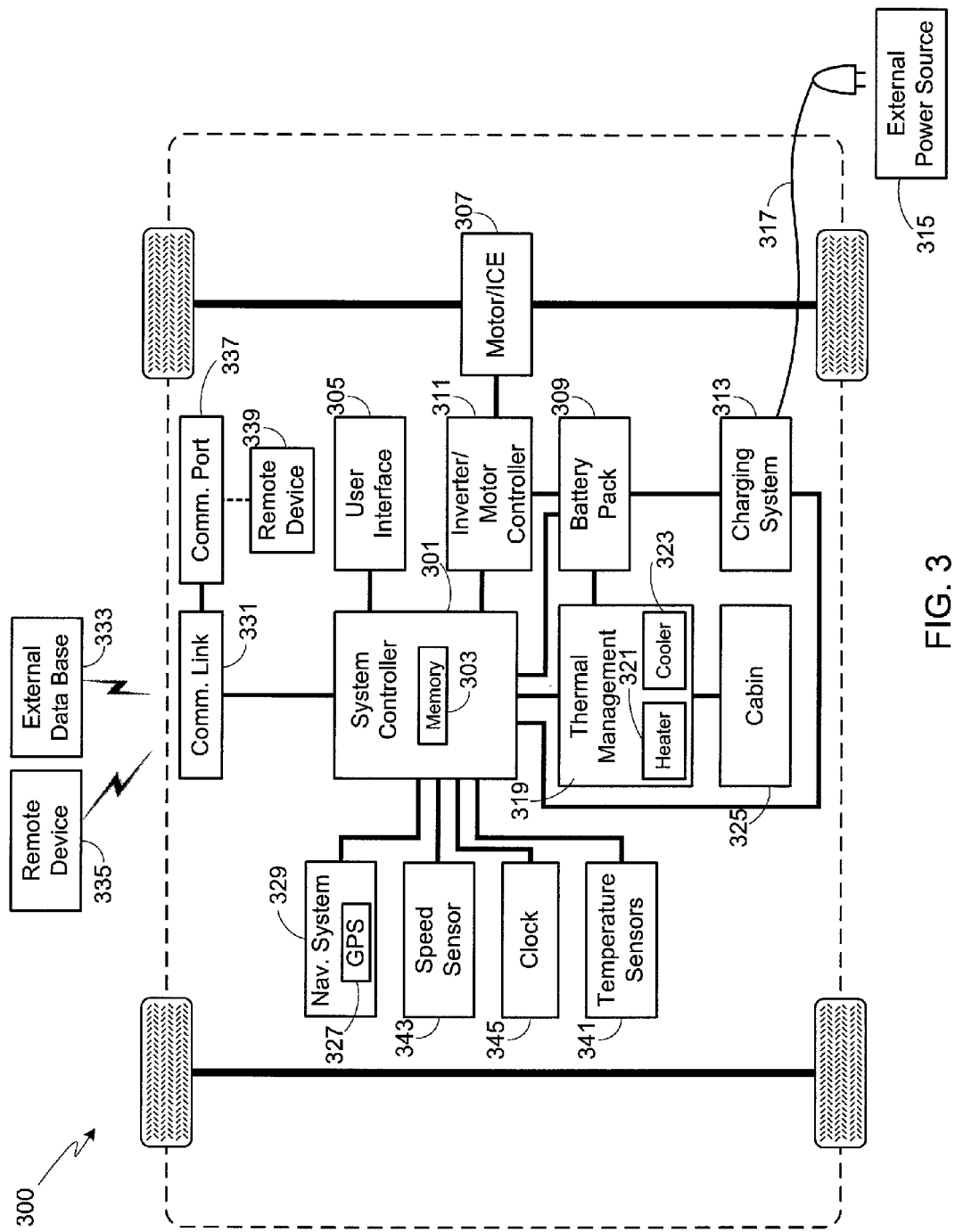
FIG. 3 provides a system level diagram of the primary EV systems utilized in at least one embodiment of the invention.

FIG. 3 is a high-level view of an EV 300 and the primary systems used in a battery lifetime optimization system in accordance with the invention. Electric vehicle 300 may be an all-electric vehicle or a hybrid vehicle utilizing both an internal combustion engine (ICE) and an electric drive system. It should be understood that the system configuration illustrated in FIG. 3 is but one possible configuration and that other configurations may be used while still retaining the functionality of the invention. Additionally, one or more of the elements shown in FIG. 3 can be grouped together in a single device, and/or circuit board, and/or integrated circuit.

Vehicle 300 includes a vehicle system controller 301, also referred to herein as a vehicle management system, which is comprised of a central processing unit (CPU). System controller 301 also includes memory 303, with memory 303 being comprised of EPROM, EEPROM, flash memory, RAM, solid state drive, hard disk drive, or any other type of memory or combination of memory types. A user interface 305 is coupled to vehicle management system 301. Interface 305 allows the driver, or a passenger, to interact with the vehicle management system, for example inputting data into the navigation system, altering the heating, ventilation and air conditioning (HVAC) system, controlling the vehicle's entertainment system (e.g., radio, CD/DVD player, etc.), adjusting vehicle settings (e.g., seat positions, light controls, etc.), and/or otherwise altering the functionality of vehicle 300. In at least some embodiments, interface 305 also includes means for the vehicle management system to provide information to the driver and/or passenger, information such as a navigation map or driving instructions as well as the operating performance of any of a variety of vehicle systems (e.g., battery pack charge level, fuel level for the engine in a hybrid vehicle, selected gear, current entertainment system settings such as volume level and selected track information, external light settings, current vehicle speed, current HVAC settings such as cabin temperature and/or fan settings, etc.). Interface 305 may also be used to warn the driver of a vehicle condition (e.g., low battery charge level) and/or communicate an operating system malfunction (battery system not charging properly, charging cable not connected properly, low tire air pressure, malfunctioning light, etc.). Interface 305 may be comprised of a single interface, for example a touch-screen display, or a combination of user interfaces such as push-button switches, capacitive switches, slide or toggle switches, gauges, display screens, visible and/or audible warning indicators, etc. It will be appreciated that if user interface 305 includes a graphical display, controller 301 may also include a graphical processing unit (GPU), with the GPU being either separate from or contained on the same chip set as the CPU.

Vehicle 300 includes a propulsion source 307 that is comprised of one or more motors, and may additionally include an internal combustion engine (e.g., in a hybrid vehicle). The vehicle's propulsion source 307 may be mechanically coupled to the front axle/wheels, the rear axle/wheels, or both, and may utilize any of a variety of transmission types (e.g., single speed, multi-speed) and differential types (e.g., open, locked, limited slip).

Energy is supplied to the motor(s) in source 307 by a battery pack 309. Battery pack 309, which may be comprised of one or hundreds or thousands of rechargeable batteries, is preferably also used to supply the energy necessary for the various vehicle systems that require electrical power (e.g., lights, entertainment systems, navigation system, etc.). Typically battery pack 309 is coupled to the motor(s) within source 307 via a power control system 311 (i.e., an inverter and motor controller) that insures that the energy delivered to the drive motor is of the proper form (e.g., correct voltage, current, waveform, etc.).

Battery pack 309 is charged by a charging system 313. Preferably charging system 313 is integrated into vehicle 300 as shown, although an external charging system may also be used with vehicle 300. Charging system 313 is configured to be electrically connected to an external source 315, such as a municipal power grid, typically by using a power cord 317. In at least one configuration, charging system 313 is wirelessly connected to external source 315, for example using an inductive charging pad over which vehicle 300 is parked. Battery pack 309 may also be charged, at least in part, using an on-board charging system such as a regenerative braking system.

Vehicle 300 includes a thermal management system 319 that includes both a heating subsystem 321 and a cooling subsystem 323. Thermal management system 319 may be used to maintain the passenger cabin 325 within the desired temperature range as well as to insure that the batteries within battery pack 309 are maintained within the batteries' desired operating, charging and/or storage temperature ranges. When system 319 is used to control the temperature of battery pack 309, the system may utilize heated or cooled air, circulating the heated or cooled air throughout the battery pack; alternately, a coolant circulation system may be thermally coupled to the battery pack, where the coolant is heated by heater 321 or cooled by cooler 323 as required.

In at least one preferred embodiment, vehicle 300 includes a global positioning system (GPS) 327, thereby allowing the position of the vehicle to be determined. GPS 327 may be a stand-alone system or, as preferred, integrated into a navigation system 329.

Coupled to vehicle management system 301 is a communication link 331. Communication link 331 may be used to wirelessly obtain configuration updates from an external data source (e.g., manufacturer, dealer, service center, web-based application, remote home-based system, third party source, etc.) or access an external data base 333, for example a data base maintained by the car's manufacturer or other third party. Communication link 331 may also be used to provide a communication link between the system controller 101 and a user device or system, for example the user's smartphone, tablet, personal digital assistant (PDA), home computer, work computer, network-based computing system, etc. Link 331 may use any of a variety of different technologies (e.g., GSM, EDGE, UMTS, CDMA, DECT, WiFi, WiMax, etc.).

In some embodiments, communication link 331 may also include an on-board port 337, such as a USB, Thunderbolt, or other port. Port 337 allows communication between a system controller 301 and a user device or system 339 (e.g., smartphone, tablet, personal digital assistant (PDA), home computer, work computer, network-based computing system, etc.) over a wired communication link.

Figure 4:
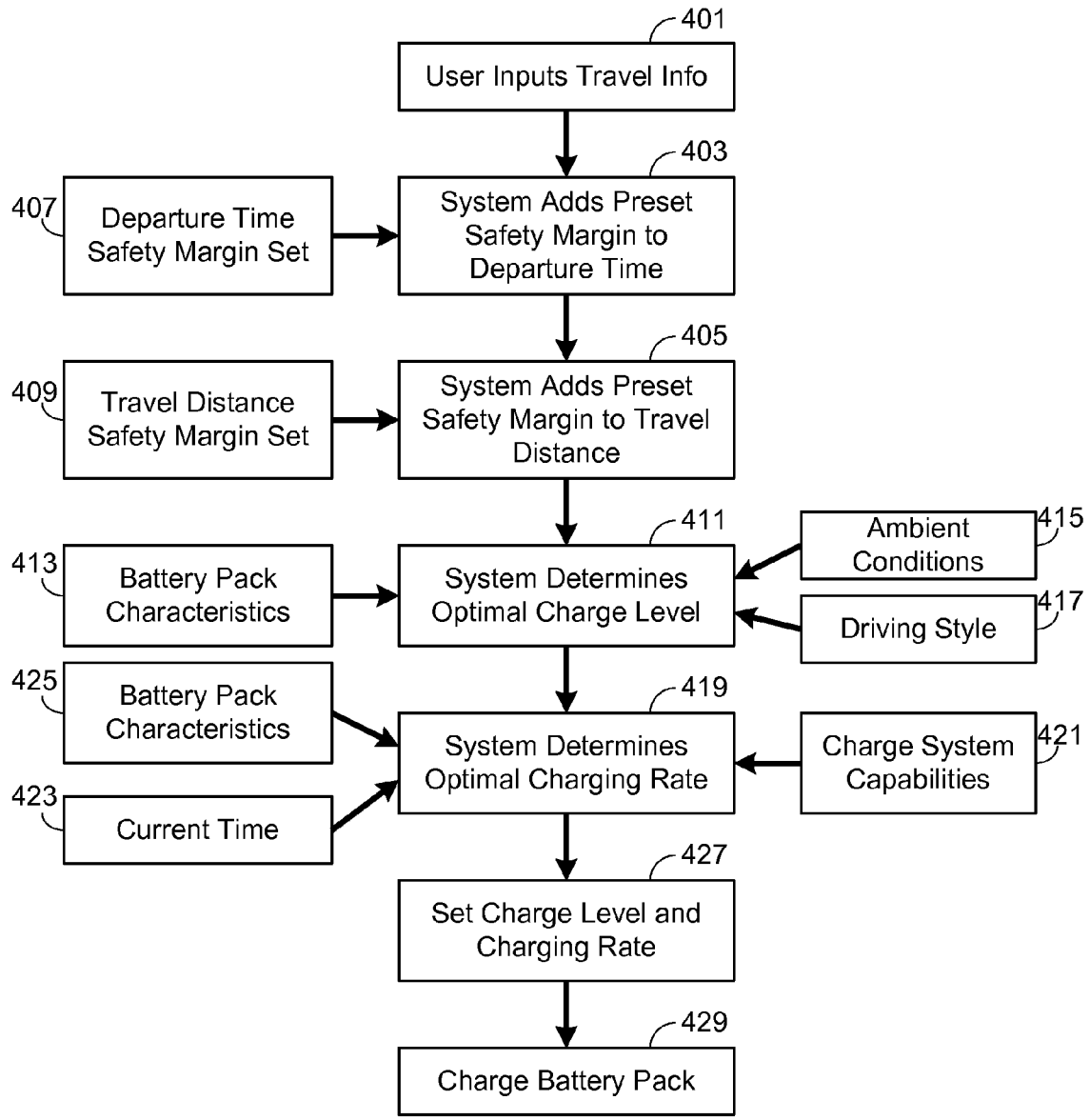
FIG. 4 illustrates the basic methodology of the invention in accordance with a preferred embodiment.

FIG. 4 illustrates the basic methodology of the invention in accordance with at least one embodiment of the invention. Initially the user inputs travel information for all travel to be carried out after the next charge cycle (step 401). The information input during step 401 may be input using interface 305; alternately, this information may be input using a device 339 that is coupled to controller 301 via port 337; alternately, this information may be input using a device 335 that is coupled to controller 301 via wireless communication link 331.

In step 401, the user inputs departure time and travel distance. The departure time represents the first time that the car will be needed after completing the next charge cycle. For example, the user may intend to charge the car at night, and then leave the next morning at 8:00 AM for that day's activities. In some scenarios the departure time may be days later, rather than the next day. For example, the user may intend to charge the car after returning from work on Friday, and then not expect to use the car until the following Monday. Accordingly it will be appreciated that departure time preferably includes both time and day. In some configurations, however, the system may be preset to assume that travel is to be performed the next day at the designated time unless the user inputs a day other than the next day.

The travel distance input in step 401 represents the total distance that the user intends to travel after the next charge cycle is complete and before the following charge cycle is initiated. Therefore the travel distance input in this step may be the distance for a portion of a day, assuming that the user intends to charge during the day (e.g., charging while at work); alternately, the distance may be for an entire day, assuming that the user routinely charges upon returning home each night; alternately, the distance may be for a period of several days if the user does not charge the vehicle at least once every day.

In a preferred configuration, the user inputs the intended travel distance in miles or kilometers. In an alternate configuration, the user inputs a travel itinerary into the system controller 301. The controller then determines the expected travel distance based on that itinerary. For example, the user may input the location of a school as the first stop, a work location as the second stop, a restaurant as the third stop, the work location as the fourth stop (e.g., returning to work after lunch), the school as the fifth stop, a grocery store as the sixth stop, and back home as the final destination. Based on the vehicle's current location, system controller 301 is able to calculate the total travel distance for this itinerary. In a variation of this configuration, instead of inputting a series of locations as a means of defining the itinerary, the user may input a series of destination names, or a combination of destination names and locations depending upon the user's knowledge of each stop in the itinerary. Thus, for example, the user may input either Redwood High School as the name of the first stop, or 395 Doherty Drive, Larkspur, Calif. as the location of the first stop. In at least one embodiment, the user is able to input locations and/or location names by selecting from a contact list contained in memory 303, or contained in an external data base 333, or contained in a data base stored in a remote device (e.g., user's smartphone) 335 that is wirelessly connected to the system controller via link 331, or contained in a data base stored in a remote device (e.g., user's smartphone) 339 that is plugged into communication port 337.

Once the departure time and the travel distance have been input into system controller 301, preferably the system controller adds a safety margin to the departure time (step 403) and a safety margin to the travel distance (step 405). Adding a safety margin insures that the car is charged and ready for use if the user decides to leave earlier than expected, or if the travel takes a larger charge than expected, for example due to heavy traffic or unexpected additions to the itinerary. The departure time safety margin used in step 403 is input into the system in step 407, although as noted below it may be input in step 401. This safety margin may be input once, for example by the vehicle's manufacturer or a third party or the end user; alternately, the departure time safety margin may be input and then remain at that setting until altered by the vehicle's manufacturer or a third party or the end user; alternately, the departure time safety margin may be input by the user at the same time as the travel info is input in step 401. Preferably the departure time safety margin is given in terms of minutes. Thus, for example, if the user inputs a user departure time of 8:00 AM and the departure time safety margin is preset to 30 minutes, then the system would insure that the car was ready for departure, i.e., charged, by 7:30 AM.

The travel distance safety margin used in step 403 is input into the system in step 409, although as noted below it may be input in step 401. This safety margin may be input once, for example by the vehicle's manufacturer or a third party or the end user; alternately, the travel distance safety margin may be input and then remain at that setting until altered by the vehicle's manufacturer or a third party or the end user; alternately, the travel distance safety margin may be input by the user at the same time as the travel info is input in step 401. Preferably the travel distance safety margin is given in terms of miles or kilometers, e.g., if a travel distance of 50 miles is input during step 401 and the preset safety margin is 10 miles, then the controller would insure that the car is charged to a sufficient level to travel 60 miles (i.e., the input distance plus the safety margin). Alternately, the travel distance safety margin may be provided in terms of a percentage, thus automatically adjusting for differences in intended travel distance. If the safety margin is given as a percentage, for example 10%, then in the above example of an input travel distance of 50 miles the controller would insure sufficient charge for the car to travel 55 miles (i.e., the input distance plus 10% of that distance).

In step 411 system controller 301 determines the appropriate charge level, i.e., the state-of-charge (SOC), required by battery pack 309 in order for vehicle 300 to meet the travel distance input in step 401 and increased by the safety margin added in step 405. In order to accurately determine the charge level, system controller uses the battery pack characteristics input into the system in step 413. In general, the primary battery pack characteristics are energy (e.g., kWh) and DC resistance. In some embodiments, a conversion efficiency may be used which not only takes into account the specifics of the pack, but also specifics of the car (e.g., aerodynamics and vehicle weight). Expected driving conditions may also be included as they impact conversion efficiency. (e.g., speed, changes in road elevation during the planned itinerary, temperature, etc.). In one embodiment, the battery pack characteristics are input by the vehicle's manufacturer, for example in the form of a look-up table, and are based on the battery pack in question. Preferably the set of battery pack characteristics includes a preset aging factor that can be used by controller 301 to alter the characteristics of the pack based on charge cycles to date, battery pack age, etc. In a preferred embodiment, a dynamic battery model is used to supply the battery pack characteristics. The dynamic battery model may use a baseline set of battery pack characteristics that are input by the vehicle's manufacturer, but which are continually (or periodically) modified by controller 301 based on actual battery pack performance data (e.g., measured voltage, current, SOC, charge cycles to date, SOC charge levels to date, etc.) acquired by the controller 301 for the actual battery pack in question. Regardless of whether the battery pack characteristics utilized by the system controller are based on a model input by the manufacturer or based on measured performance characteristics of the actual battery pack in question, preferably the battery pack characteristics are modified based on measured environmental conditions (e.g., ambient temperature measure using sensors 341) that are input in step 415 as well as expected driving style (step 417). The driving style information input in step 417 may be based on monitored driving style, e.g., an average of the speed monitored by speed sensors 343, or an average of the speed monitored by speed sensors 343 over the same travel plan, or based on an intended driving style (e.g., conservative, moderate, aggressive) that the user selects and inputs during the initial data inputting step 401.

At a minimum the charge level determined in step 411 by system controller 301 is that required to meet the travel distance input in step 401 plus the safety margin added in step 405. It should be understood, however, that the charge level determined in step 411 may be greater than this minimum level if system controller 301 determines that a higher charge level is better for the life of the battery pack. For example, since many batteries/battery chemistries are susceptible to damage when drained to an excessively low level, system controller 301 may be configured to insure that when the car arrives back from the planned itinerary, the level of remaining charge in battery pack 309 is greater than a preset minimum SOC. Preferably the preset minimum SOC is preset by the manufacturer, although the system may be configured to accept this preset minimum SOC from a different source (e.g., a third party).

After the desired charge level has been set by controller 301 in step 411, the controller then determines the desired rate of charge to be used during battery pack charging (step 419). During step 419, controller 301 factors in (i) the desired charge level determined in step 411, (ii) the intended departure time plus safety margin that was input during step 401, and (iii) the capabilities of the charging system that are input into the system in step 421. In order to calculate how much time is available for charging, in addition to the intended departure time, controller 301 uses an internal clock 345 to determine the current time (step 423). In order to accurately determine the best charge rate for battery pack 309, in at least one embodiment rather than simply minimizing charge rate, the battery pack characteristics are input into the system (step 425). As noted above, battery pack characteristics may be input by the vehicle's manufacturer. Preferably, however, if the system uses a baseline set of battery pack characteristics input by the vehicle's manufacturer, controller 301 modifies these characteristics based on monitored battery pack performance data acquired by the controller 301 for the battery pack in question.

Figure 5:
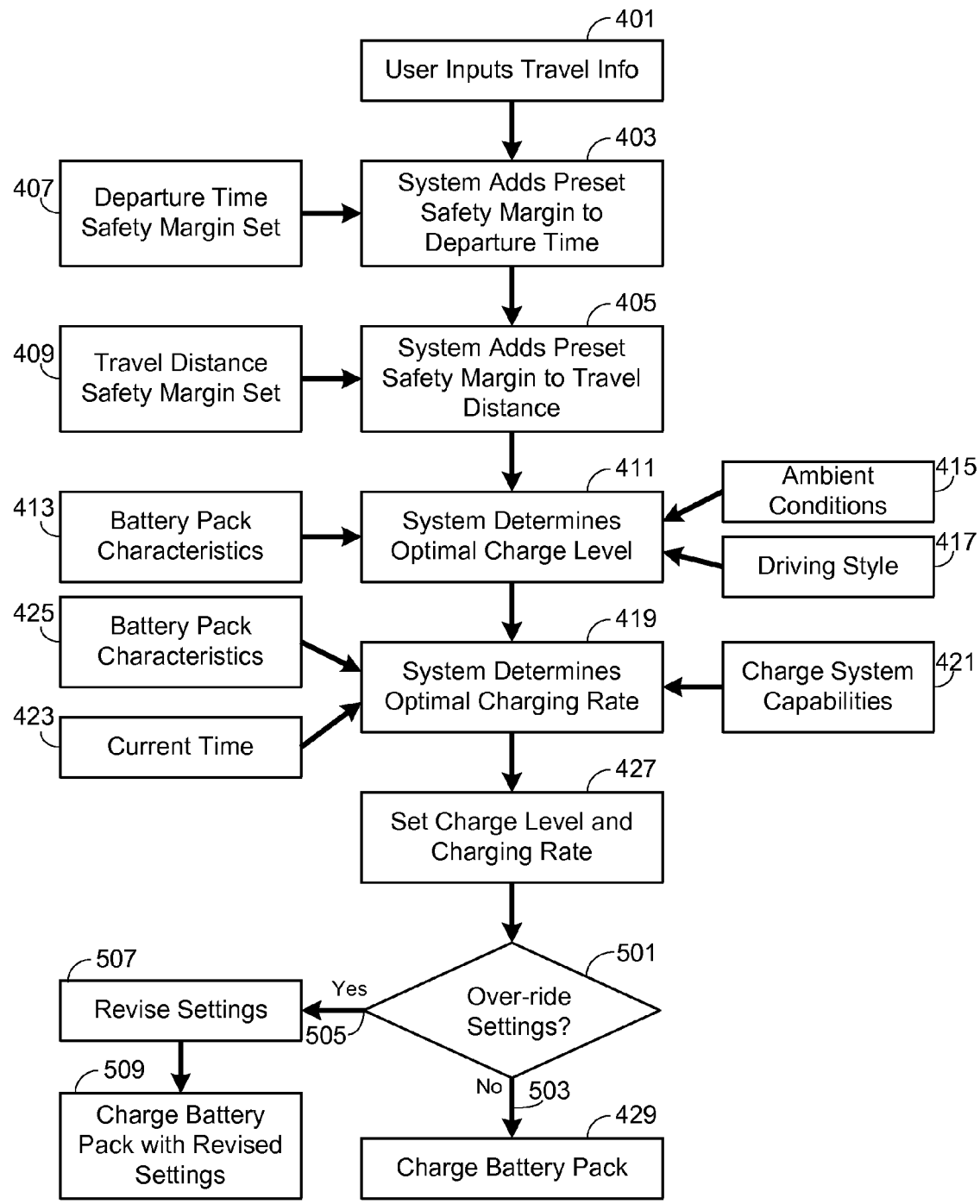
FIG. 5 illustrates a modification of the methodology shown in FIG. 4.

Once the controller 301 optimizes both the desired upper charge level (SOC) in step 411 and the charging rate in step 419 in order to maximize battery lifetime while meeting the needs (e.g., driving range and departure time) of the user, then the controller sets the upper charge level and the charging rate for charging system 313 (step 427). In the preferred embodiment controller 301 automatically charges battery pack 309 using the charge level and charging rate settings determined in steps 411 and 419 (step 429). In an alternate embodiment illustrated in FIG. 5, after optimizing the upper charge level (step 411) and charging rate (step 419), the user is given an option whether or not to accept the optimized settings (step 501). If the user decides to accept the optimized settings (step 503), then charging is performed automatically using those settings (step 429). If the user decides to revise the optimized settings (step 505), then the user inputs revised settings (step 507) and the system charges the battery pack using the revised settings (step 509).

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of optimizing a set of charging parameters for a battery pack coupled to an electric drive train of a vehicle, the method comprising the step of:
   accepting a set of user determined travel information, wherein said set of user determined travel information is comprised of an intended departure time and an intended travel distance, wherein said set of user determined travel information is accepted by a system controller of said vehicle, and wherein said set of user determined travel information is input into said system controller by a user utilizing an input device;
   determining an optimal charge level for said battery pack, wherein said optimal charge level maximizes a battery lifetime characteristic of said battery pack while being sufficient to supply energy to said electric drive train for said vehicle to travel said intended travel distance, and wherein said step of determining said optimal charge level is performed by said system controller;
   determining an optimal charging rate for said battery pack, wherein said optimal charging rate maximizes said battery lifetime characteristic of said battery pack while being sufficient to complete charging of said battery pack to said optimal charge level prior to said intended departure time, and wherein said step of determining said optimal charging rate is performed by said system controller; and
   charging said battery pack of said vehicle to said optimal charge level, wherein said charging step is performed at said optimal charging rate, wherein said intended departure time identifies a first expected time of usage for the vehicle after completion of the step of charging said battery pack of said vehicle to said optimal charge level and at said optimal charging rate, and wherein said intended travel distance identifies a total expected travel distance for said vehicle to travel during a period of time occurring between completion of said step of charging said battery pack and initiation of a subsequent charging cycle.

2. The method of claim 1, wherein said intended travel distance corresponds to a user itinerary, wherein said method further comprises the step of calculating said total expected travel distance based on said user itinerary, and wherein said optimal charge level maximizes said battery lifetime characteristic of said battery pack while being sufficient to supply energy to said electric drive train for said vehicle to travel said total expected travel distance.

3. The method of claim 2, wherein said user itinerary is comprised of a plurality of locations.

4. The method of claim 1, wherein said step of determining said optimal charge level for said battery pack is based on a set of battery pack characteristics and said intended travel distance and said battery lifetime characteristic.

5. The method of claim 1, wherein said set of battery pack characteristics is comprised of a set of battery pack conversion efficiency data.

6. The method of claim 4, wherein said set of battery pack characteristics is comprised of a set of battery pack energy and DC resistance data.

7. The method of claim 4, further comprising the step of inputting said set of battery pack characteristics into said system controller, wherein a vehicle manufacturer performs said step of inputting said set of battery pack characteristics.

8. The method of claim 4, further comprising the step of modifying said set of battery pack characteristics based on a monitored age of said battery pack, wherein said modifying step is performed by said system controller.

9. The method of claim 4, further comprising the steps of:
monitoring said battery pack to determine a set of performance characteristics of said battery pack, wherein said monitoring step is performed by said system controller;
recording said set of performance characteristics of said battery pack; and
modifying a baseline set of battery pack characteristics in view of said set of performance characteristics to determine said set of battery pack characteristics, wherein said system controller performs said step of modifying said baseline set of battery pack characteristics to determine said set of battery pack characteristics.

10. The method of claim 4, further comprising the step of determining a driving style for a user of said vehicle, wherein said step of determining said optimal charge level for said battery pack is based on said set of battery pack characteristics and said driving style and said intended travel distance and said battery lifetime characteristic.

11. The method of claim 4, further comprising the step of determining a set of ambient environmental conditions, wherein said step of determining said optimal charge level for said battery pack is based on said set of battery pack characteristics and said set of ambient environmental conditions and said intended travel distance and said battery lifetime characteristic.

12. The method of claim 1, wherein said optimal charge level determined by said system controller is sufficient to supply energy to said electric drive train for said vehicle to travel said intended travel distance and maintain at least a minimum state-of-charge (SOC) until a subsequent charging cycle.

13. The method of claim 12, further comprising the step of inputting said minimum SOC into said system controller.

14. The method of claim 1, further comprising the step of monitoring a current time, wherein said step of determining said optimal charging rate for said battery pack is based on said optimal charge level and said intended departure time and said current time and said battery lifetime characteristic.

15. The method of claim 1, wherein said step of determining said optimal charging rate for said battery pack is based on a set of battery pack characteristics and said optimal charge level and said intended departure time and said battery lifetime characteristic.

16. The method of claim 15, further comprising the step of inputting said set of battery pack characteristics into said system controller, wherein a vehicle manufacturer performs said step of inputting said set of battery pack characteristics.

17. The method of claim 15, further comprising the step of modifying said set of battery pack characteristics based on a monitored age of said battery pack, wherein said modifying step is performed by said system controller.

18. The method of claim 15, further comprising the steps of
monitoring said battery pack to determine a set of performance characteristics of said battery pack, wherein said monitoring step is performed by said system controller;
recording said set of performance characteristics of said battery pack; and
modifying a baseline set of battery pack characteristics in view of said set of performance characteristics to determine said set of battery pack characteristics, wherein said system controller performs said step of modifying said baseline set of battery pack characteristics to determine said set of battery pack characteristics.

19. The method of claim 1, wherein said charging step is performed automatically by said system controller.

20. The method of claim 1, further comprising the steps of issuing a confirmation request prior to performing said step of charging said battery pack, wherein said system controller automatically performs said step of charging said battery pack when a positive response to said confirmation request is received, and wherein said system controller does not perform said step of charging said battery pack when a negative response to said confirmation request is received.

21. The method of claim 1, wherein said input device is comprised of a user interface coupled to said system controller.

22. The method of claim 1, wherein said input device is comprised of a remote device coupled to said system controller via a communication port.

23. The method of claim 1, wherein said input device is comprised of a remote device coupled to said system controller via a wireless communication link.

24. A method of optimizing a set of charging parameters for a battery pack coupled to an electric drive train of a vehicle, comprising the steps of:
accepting a set of user determined travel information, wherein said set of user determined travel information is comprised of an intended departure time and an intended travel distance, and wherein said set of user determined travel information is accepted by a system controller of said vehicle;
adding a first safety margin to said intended departure time to define a modified departure time, wherein said first safety margin is added to said intended departure time by said system controller;
adding a second safety margin to said intended travel distance to define a modified travel distance, wherein said second safety margin is added to said intended travel distance by said system controller;
determining an optimal charge level for said battery pack, wherein said optimal charge level maximizes a battery lifetime characteristic of said battery pack while being sufficient to supply energy to said electric drive train for said vehicle to travel said modified travel distance, and wherein said step of determining said optimal charge level is performed by said system controller;
determining an optimal charging rate for said battery pack, wherein said optimal charging rate maximizes said battery lifetime characteristic of said battery pack while being sufficient to complete charging of said battery pack to said optimal charge level prior to said modified departure time, and wherein said step of determining said optimal charging rate is performed by said system controller; and
charging said battery pack of said vehicle to said optimal charge level, wherein said charging step is performed at said optimal charging rate.

25. The method of claim 24, wherein said modified departure time is earlier than said intended departure time by said first safety margin, and wherein said modified travel distance is greater than said intended travel distance by said second safety margin.

26. The method of claim 25, further comprising the step of calculating said second safety margin by multiplying said intended travel distance by a preset percentage.

27. The method of claim 25, further comprising the step of accepting a set of user defined safety margins, wherein said set of user defined safety margins are comprised of said first and second safety margins, and wherein said set of user defined safety margins are accepted by said system controller.

28. The method of claim 25, further comprising the step of accepting a set of manufacturer defined safety margins, wherein said set of manufacturer defined safety margins is comprised of said first and second safety margins, and wherein said set of manufacturer defined safety margins are accepted by said system controller.

29. The method of claim 24, wherein said intended departure time identifies a first expected time of usage for the vehicle after completion of the step of charging said battery pack of said vehicle to said optimal charge level and at said optimal charging rate.

30. The method of claim 2, wherein said intended travel distance identifies a total expected travel distance for said vehicle to travel during a period of time occurring between completion of said atop of charging said battery pack and a subsequent charging cycle.

31. The method of claim 24, wherein said intended travel distance corresponds to a user itinerary, wherein said method further comprises the step of calculating a total travel distance based on said user itinerary, and wherein said optimal charge level maximizes said battery lifetime characteristic of said battery pack while being sufficient to supply energy to said electric drive train for said vehicle to travel said total travel distance.

32. The method of claim 31, wherein said user itinerary is comprised of a plurality of locations.

33. The method of claim 24, wherein said step of determining said optimal charge level for said battery pack is based on a set of battery pack characteristics and said intended travel distance and said battery lifetime characteristic.

34. The method of claim 33, wherein said set of battery pack characteristics is comprised of a set of battery pack conversion efficiency data.

35. The method of claim 33, wherein said set of battery pack characteristics is comprised of a set of battery pack energy and DC resistance data.

36. The method of claim 33, further comprising the step of inputting said set of battery pack characteristics into said system controller, wherein a vehicle manufacturer performs said step of inputting said set of battery pack characteristics.

37. The method of claim 33, further comprising the step of modifying said set of battery pack characteristics based on a monitored age of said battery pack, wherein said modifying step is performed by said system controller.

38. The method of claim 33, further comprising the steps of:
monitoring said battery pack to determine a set of performance characteristics of said battery pack, wherein said monitoring step is performed by said system controller;
recording said set of performance characteristics of said battery pack; and
modifying a baseline set of battery pack characteristics in view of said set of performance characteristics to determine said set of battery pack characteristics, wherein said system controller performs said step of modifying said baseline set of battery pack characteristics to determine said set of battery pack characteristics.

39. The method of claim 33, further comprising the step of determining a driving style for a user of said vehicle, wherein said step of determining said optimal charge level for said battery pack is based on said set of battery pack characteristics and said driving style and said intended travel distance and said battery lifetime characteristic.

40. The method of claim 33, further comprising the step of determining a set of ambient environmental conditions, wherein said step of determining said optimal charge level for said battery pack is based on said set of battery pack characteristics and said set of ambient environmental conditions and said intended travel distance and said battery lifetime characteristic.

41. The method of claim 24, wherein said optimal charge level determined by said system controller is sufficient to supply energy to said electric drive train for said vehicle to travel said intended travel distance and maintain at least a minimum state-of-charge (SOC) until a subsequent charging cycle.

42. The method of claim 41, further comprising the step of inputting said minimum SOC into said system controller.

43. The method of claim 24, further comprising the step of monitoring a current time, wherein said step of determining said optimal charging rate for said battery pack is based on said optimal charge level and said intended departure time and said current time and said battery lifetime characteristic.

44. The method of claim 24, wherein said step of determining said optimal charging rate for said battery pack is based on a set of battery pack characteristics and said optimal charge level and said intended departure time and said battery lifetime characteristic.

45. The method of claim 44, further comprising the step of inputting said set of battery pack characteristics into said system controller, wherein a vehicle manufacturer performs said step of inputting said set of battery pack characteristics.

46. The method of claim 44, further comprising the step of modifying said set of battery pack characteristics based on a monitored age of said battery pack, wherein said modifying step is performed by said system controller.

47. The method of claim 44, further comprising the steps of:
monitoring said battery pack to determine a set of performance characteristics of said battery pack, wherein said monitoring step is performed by said system controller;
recording said set of performance characteristics of said battery pack; and
modifying a baseline set of battery pack characteristics in view of said set of performance characteristics to determine said set of battery pack characteristics, wherein said system controller performs said step of modifying said baseline set of battery pack characteristics to determine said set of battery pack characteristics.

48. The method of claim 24, wherein said charging step is performed automatically by said system controller.

49. The method of claim 24, further comprising the steps of issuing a confirmation request prior to performing said step of charging said battery pack, wherein said system controller automatically performs said step of charging said battery pack when a positive response to said confirmation request is received, and wherein said system controller does not perform said step of charging said battery pack when a negative response to said confirmation request is received.

50. The method of claim 24, wherein said set of user determined travel information is input via a user interface coupled to said system controller.

51. The method of claim 24, wherein said set of user determined travel information is input from a remote device coupled to said system controller via a communication port.

52. The method of claim 24, wherein said set of user determined travel information is input from a remote device coupled to said system controller via a wireless communication link.

\* \* \* \* \*